Patented July 13, 1954

2,683,664

UNITED STATES PATENT OFFICE 2,683,664

MINERAL CONCENTRATE

Alvis E. Greer, Houston, Tex.

No Drawing. Application January 19, 1951,
Serial No. 206,915

8 Claims. (Cl. 99—2)

This invention relates to a mineral concentrate adapted to be employed as a dietary supplement for animals and poultry. In one of its aspects, it relates to a method for preventing deterioration of such a mineral concentrate and to the composition of matter produced thereby. In still another of its aspects, this invention relates to a method for improving the granulation and color characteristics of a mineral concentrate and to the composition of matter produced thereby.

A few principal mineral elements make up the greater part of the mineral content of an animal body including calcium, magnesium, sodium, potassium, phosphorus and chlorine. These and other necessary minerals are supplied to the animal as naturally occurring ingredients of the food normally eaten by the animal. However, in many parts of the country, one or more of these elements may be so lacking in the soil upon which the food is grown that insufficient amounts of these elements for proper dietary balance are supplied to the animal. This lack is particularly prevalent with respect to the so-called "trace elements," such as cobalt, iron, copper, iodine, manganese, zinc and sulphur, and it is well known that the normal animal diet often fails to supply even the very small daily requirements of certain of these trace elements. Furthermore, traces of other elements not found in the diet and not normally essential for nutrition may sometimes be desirable, nevertheless, for special physiological or therapeutic effects. The dietary supplement required to meet such deficiencies may vary from time to time and from place to place as the constitution of the normal diet varies.

Accordingly, the addition of a mineral concentrate or supplement to the diet of an animal is frequently necessary or desirable. These supplements should, of course, be such that the minerals are made available to the animal during the course of the normal digestive action and also be such that they are edible in the sense that the small amounts actually ingested do not cause objectionable toxic effects. Such mineral supplements may be admixed with the feed normally fed to the animal.

One disadvantage encountered in employing such mineral concentrates arises from the fact that a very small amount of the mineral concentrate or supplement, normally only a few ounces, is fed to the animal each day and accordingly, when a considerable amount of the mineral supplement is mixed at any one time, it must necessarily be stored over a considerable length of time before the entire amount is consumed. It has been found that when so stored, the minerals tend to deteriorate and become of less efficacy in functioning in their desired role as a dietary supplement to the animals. It is believed that this deterioration is caused by exposure of the minerals to the atmosphere, particularly to an atmosphere containing a large amount of water vapor, which in some way causes at least some of the minerals to deteriorate into an undesirable form.

Another disadvantage inherently present in such mineral supplements and which is encountered by the manufacturers and suppliers thereof is that they are of a disagreeable color. Ordinarily, such supplements are of a dirty brown or gray color which does not present the necessary eye appeal to customers.

It is an object of this invention to provide a mineral concentrate adapted to be fed to animals and poultry which is not subject to deterioration through exposure to an atmosphere. Another object of this invention is to provide a method for preventing the deterioration of a mineral concentrate.

Another object of this invention is to provide a mineral concentrate adapted to provide the necessary minerals in an animal diet and which has been stabilized by the addition of a water-insoluble soap thereto in a minor amount.

Still another object of this invention is to provide a mineral concentrate which has improved color and granulation characteristics.

Still yet another object of this invention is to provide a method for improving the color and granulation characteristics of a mineral mixture by adding water thereto in a minor amount.

Other objects, advantages and features of this invention will become apparent to one skilled in the art upon considering the specification and appended claims.

In accordance with this invention, a mineral concentrate is prepared by admixing the proper minerals containing the desired physiologically beneficial elements in a nutritionally available form with a water-insoluble soap. Such concentrate can be readily prepared by placing the desired amounts of the various minerals in a mixing apparatus, adding the desired amount of soap and then mixing the constituents for a period of time sufficient to insure thorough admixing. Also according to this invention, the color of such mineral concentrate can be improved by adding a small amount of water thereto. Although it might seem apparent that the addition of water to such mineral concentrate would cause dissolution of the soap to such an extent that the water could cause deterioration of the minerals, such has not been found to occur. On the contrary, it is surprising indeed to find that the addition of a small amount of water actually causes the mineral mixture to change from its normally ashen gray color to a rich deep golden brown color without any substantial deterioration of the minerals. Further, the addition of such water improves the granulation characteristics of the mineral concentrate. As ordinarily prepared, the conventional mineral concentrate is in the form of a very finely ground powder and is prone to dust and sift an undesirable extent and, therefore, is difficult to use without wastage. It has been found that the addition of the small amount of water causes the finely ground mineral concentrate to granulate into a particle size which exhibits a reduced tendency to dust or sift.

The mineral mixture which is to be employed in accordance with this invention can comprise a mixture of one or more minerals containing physiologically beneficial elements such as calcium, phosphorus, cobalt, magnesium, iron, copper, iodine, manganese, zinc, potassium, sodium and chlorine. These elements are to be supplied in forms which are readily and nutritionally available upon ingestion by an animal or fowl and which are non-toxic in the amount used. Thus, the elements can be present as a constituent of a salt, either as a cation, anion or a portion thereof. If desired two or more elements can be combined, where chemically possible, into a single salt such as the combination of calcium and phosphorus into calcium phosphate. The metallic elements can be present also as hydroxides or oxides when such form is nutritionally suitable. The following are listed as exemplary of suitable compounds for supplying one or more of the above listed physiologically beneficial elements:

TABLE I

| | |
|---|---|
| Calcium carbonate | Ferric orthophosphate |
| Calcium chloride | Cuprous carbonate |
| Calcium phosphate | Cuprous hydroxide |
| Sodium phosphate | Cupric sulfate |
| Magnesium phosphate | Cupric oxide |
| Cobaltous carbonate | Potassium iodide |
| Cobaltous hydroxide | Sodium iodide |
| Cobaltic hydroxide | Manganous carbonate |
| Colbaltic oxide | Manganous hydroxide |
| Magnesium carbonate | Manganous oxide |
| Magnesium oxide | Manganese dioxide |
| Magnesium chloride | Zinc hydroxide |
| Ferrous sulfate | Zinc carbonate |
| Ferrous hydroxide | Potassium sulfate |
| Ferrous oxide | Potassium chloride |
| Ferric hydroxide | Sodium chloride |
| Ferric pyrophosphate | Sodium sulfate |

It is to be understood that the foregoing are merely exemplary of the desirable element-containing minerals which can be employed to produce a mineral concentrate or supplement in accordance with this invention.

The amount of each compound containing the desired element to be used in any specific mineral concentrate will depend upon a number of factors. One such factor is the parts by weight of the element present in each part by weight of the different compounds containing such element. Equivalent weights of the selected compound with respect to the desired element therein should be used. Another factor which may be taken into consideration is the extent of deficiency of any particular element in the normal food supply of the animal. Such extent of deficiency will depend upon the type of food and the mineral supply in the soil where the food is grown. As a general rule, the amounts of the compounds containing the elements calcium, phosphorus, magnesium, potassium, iron, sodium and chlorine preferably constitute a major proportion of the mineral mixture while the compounds containing the elements cobalt, copper, iodine, manganese and zinc constitute a minor proportion of the mineral mixture. The following table sets forth the amounts of the various elements to be contained in the minerals constituting a complete mineral diet:

TABLE II

| Element | Optimum Concentration, Parts by Weight | Range, Parts by Weight |
|---|---|---|
| Co | .006 | 0.002–0.03 |
| Fe | .327 | 0.2–0.6 |
| Cu | .032 | 0.02–0.06 |
| I | .029 | 0.015–0.03 |
| Zn | .044 | 0.02–0.20 |
| Mn | .064 | 0.03–0.20 |
| Mg | .558 | 0.25–5.0 |
| K | 3 | 2–9 |
| Ca | 18.3 | 13–23 |
| P | 8.84 | 7–11 |
| Na | 26.5 | 23–29 |
| Cl | 40.9 | 36–45 |
| Soap in equivalents of stearic acid | 1.4 | 0.5–10 |
| | 100.000 | |

Of course, it is to be understood that the equivalent weight of the selected chemical compound containing the desired element must be employed to furnish the necessary amount of said element. Thus, the optimum amount of the water-insoluble soap employed should be that weight equivalent to 1.4 parts by weight of stearic acid.

The water-insoluble soap which is to be admixed with the mineral concentrate according to this invention can be any substantially water-insoluble soap which is non-toxic to the animal in the amount consumed and which has a melting point substantially above the highest atmospheric temperature to be encountered. Such insoluble soaps are those formed by the combination of a metal, such as the alkaline earth metals, magnesium, and the non-toxic heavy metals, with an organic acid of the group consisting of the fatty acids having from fourteen to twenty carbon atoms per molecule and oleic acid. By way of example, the metals which can be employed are calcium, strontium, barium, magnesium, iron, zinc, cobalt and the like. Among the fatty acids are myristic, palmitic, margaric, stearic, and arachidic acid.

The amount of the selected soap which is to be employed should be sufficient to at least partially coat the granules or particles of mineral material to such an extent that they will not deteriorate upon exposure to atmospheric conditions. An amount of the selected soap within an approximate range of five-tenths to ten, preferably one to three, weight per cent of the total mineral mixture can be employed satisfactorily.

In accordance with this invention, water can be added to a mineral concentrate containing a water-insoluble soap to cause the mineral concentrate to change from an undesirable color to one which is more desirable. Preferably, the water is added after the mineral mixture and the soap have been intimately contacted together. The amount of water which is to be employed can be within the range of one and one-half to ten, preferably two to four, per cent by weight. The intensity of the color obtained is substantially directly proportional to the amount of water added and to the length of mixing time employed after the water has been added to the mineral concentrate. Ordinarily, a mixing time within the range of fifteen to thirty minutes is suitable. However, a longer mixing time results in a deepening of the color and accordingly, when such a longer mixing time is employed, an amount of water within the lower portion of the aforesaid range can be used. Conversely, when a shorter mixing time is used, an amount of water near the upper limit should be added.

In the preparation of laboratory batches of the concentrates of this invention, satisfactory mixing can be obtained with a mortar and pestle. In commercial production, a trowel type of batch mixer, Simpson mixer or other suitable equipment insuring intimate intermixing can be used, it being particularly important to insure intimate contact of the insoluble soap and the added water with the mineral concentrate.

The mineral concentrate of this invention should be fed to animals and poultry at the rate of about four ounces daily per one thousand pounds of live body weight.

*Example*

A mineral concentrate was compounded as follows:

A trace mineral premixture was mixed by admixing the following compounds in the noted proportions:

| Compound: | Weight per cent |
|---|---|
| Cobalt carbonate | 0.75 |
| Copper carbonate | 4.55 |
| Manganese carbonate | 10.0 |
| Zinc carbonate | 5.8 |
| Potassium iodide | 2.8 |
| Defluorinated calcium phosphate | 76.1 |
| | 100.00 |

The mineral concentrate was then formed by admixing the following in the noted proportions:

| Compound: | Weight per cent |
|---|---|
| Sodium chloride | 50. |
| Defluorinated calcium phosphate | 35. |
| Calcium carbonate | 5. |
| Potassium sulfate | 5. |
| Magnesium carbonate | 1.5 |
| Ferrous sulfate | 1.25 |
| Calcium stearate | 1.05 |
| Trace mineral premixture | 1. |
| Irradiated yeast sterol | 0.2 |
| | 100.00 |

The resulting product was a mineral concentrate able to withstand frequent and long exposures to humid atmospheres without deterioration. However, the product exhibited an ashen gray color.

Upon the addition of about 2.5 weight per cent of water to the mineral concentrate and mixing the same for about fifteen minutes, the mineral concentrate changed to a golden brown color which gradually deepened in hue as the mixing continued. Also, the mineral concentrate began to form into granules which decreased the amount of dusting and sifting. The final brown product was maintained in storage for several weeks and did not deteriorate to any noticeable degree.

A daily dosage of four ounces of the resulting mineral concentrate affords the following amounts of the essential elements:

| Element: | Amount per dosage | |
|---|---|---|
| Ca | grams | 14.5 |
| P | do | 7.3 |
| Na | do | 19.5 |
| K | do | 2.5 |
| Cl | do | 30.0 |
| Mg | do | 0.4 |
| Fe | milligrams | 280. |
| Mn | do | 50. |
| Zn | do | 35. |
| Cu | do | 27. |
| I | do | 18. |
| Co | do | 3.5 |

Mineral concentrates made according to this invention not only resist deterioration over a period of many months but also can be readily handled without inordinate dusting or sifting of the material. Thus, when practicing the process of this invention wherein water-insoluble soap is added to the mineral concentrate, large batches of the mineral concentrate can be prepared and stored over long periods of time even in humid climates. Also, when water is added in accordance with this invention, the mineral concentrate obtains a deep brown color highly desirable in marketing the concentrate. Such color does not fade over periods of long standing but, if anything, tends to deepen in intensity with age.

From the foregoing it will be seen that this invention is one well adapted to attain all of the ends and objects hereinabove set forth together with other advantages which are obvious and which are inherent to the process and product.

It will be understood that certain features and subcombinations are of utility and may be employed without reference to other features and subcombinations. This is contemplated by and is within the scope of the claims.

The invention having been described, what is claimed is:

1. A method for improving the granulation and color characteristics of a mineral concentrate containing physiologically beneficial elements and coated with a water-insoluble soap which comprises admixing water therewith in an amount within the range of one and one-half to ten weight per cent.

2. A method for improving the granulation and color characteristics of a mixture of minerals containing physiologically beneficial elements and coated with a water-insoluble soap formed by the combination of a metal selected from the group consisting of the alkaline earth metals, magnesium and the non-toxic heavy metals with an organic acid selected from the group consisting of the fatty acids having fourteen to twenty carbon atoms per molecule and oleic acid, said soap being present in an amount within the range of five-tenths to ten weight per cent by weight, which comprises admixing water with said coated minerals in an amount within the range of one and one-half to ten weight per cent.

3. The method of claim 2 wherein said soap is calcium stearate and said water is added in an amount within the range of two to four weight per cent of said mineral mixture.

4. The method of claim 2 wherein said soap is magnesium stearate and said water is added in an amount within the range of two to four weight per cent of said mineral admixture.

5. A mineral concentrate for animals and poultry which comprises a particulate mixture of mineral compounds containing physiologically beneficial elements in an ingestible form and a water-insoluble soap disposed as a coating on the particles of said mixture, said soap being present in an amount within the range of one to three weight per cent so as to at least partially coat the particles of minerals to thereby prevent any substantial deterioration thereof, said mixture containing at least some compounds of trace minerals which compounds have substantial solubility in water and which are subject to deterioration of their physiologically beneficial properties when exposed to a humid atmosphere in the absence of said soap.

6. The method of reducing the deterioration of a mineral mixture adapted to be fed to animals and poultry which comprises forming a mixture of said mineral compounds, at least some of said compounds comprising trace mineral compounds having a substantial solubility in water and being subject to deterioration of their beneficial physiological properties upon exposure to a humid atmosphere, adding a soap to said mixture of mineral compounds and intimately admixing said soap with said mixture of mineral compounds to coat the particles of said mixture with said soap, said soap being water-insoluble soap comprising the combination of a metal selected from the group consisting of the alkaline earth metals, magnesium and the non-toxic heavy metals, and an organic acid selected from the group consisting of the fatty acids having fourteen to twenty carbon atoms per molecule and oleic acid, said soap being present in an amount within the range of one to three per cent by weight.

7. The method of claim 6 wherein said soap is calcium stearate.

8. The method of claim 6 wherein said soap is magnesium stearate.

References Cited in the file of this patent

UNITED STATES PATENTS

| Number | Name | Date |
|---|---|---|
| 1,958,295 | Christensen et al. | May 8, 1934 |
| 2,164,089 | Shumaker | June 27, 1939 |
| 2,480,103 | Fux | Aug. 30, 1949 |
| 2,489,760 | Dunn | Nov. 29, 1949 |